United States Patent [19]

Feminella et al.

[11] 3,930,056

[45] Dec. 30, 1975

[54] USE OF MODIFIED DRIED WHEY AS A FLAVOR ENHANCER IN FOODS

[75] Inventors: Joesph V. Feminella, Excelsior, Minn.; Nicholas Melachouris, Hartsdale; Robert M. Lauck, New City, both of N.Y.

[73] Assignee: Stauffer Chemical Company, Westport, Conn.

[22] Filed: Dec. 11, 1974

[21] Appl. No.: 531,579

Related U.S. Application Data

[63] Continuation of Ser. No. 336,844, Feb. 28, 1973, abandoned.

[52] U.S. Cl. ............... 426/646; 426/583; 426/641; 426/650; 426/589
[51] Int. Cl.² ...................................... A23C 21/00
[58] Field of Search ........... 426/583, 641, 646, 650, 426/589

[56] References Cited

UNITED STATES PATENTS

| | | | |
|---|---|---|---|
| 3,547,900 | 12/1970 | Dienst et al. | 260/112 |
| 3,589,915 | 3/1969 | Lustig | 426/105 |
| 3,686,002 | 8/1972 | Nakano et al. | 426/274 |

*Primary Examiner*—A. Louis Monacell
*Assistant Examiner*—R. A. Yoncoskie

[57] ABSTRACT

Modified dried whey derived by the molecular sieve fractionation of partially delactosed cheese whey mother liquid enhances flavor in foods and improves binding, flavor enhancement, and emulsification in comminuted meat products.

6 Claims, No Drawings

USE OF MODIFIED DRIED WHEY AS A FLAVOR ENHANCER IN FOODS

This is a continuation of application Ser. No. 336,844 filed Feb. 28, 1973, now abandoned.

BACKGROUND OF THE INVENTION

Generally, this invention relates to a new method of use for modified dried whey in foods and particularly in comminuted meat products. More particularly, this invention relates to the use of modified dried whey as a flavor enhancer in food and as a binder, flavor enhancer, and emulsifier in comminuted meat products.

Cheese whey is generally defined as the liquid remaining after the formation and removal of the cheese curd, or casein, in the case of casein production. Cheese whey, therefore, retains the aqueous soluble constituents originally found in milk. Specifically, cheese whey contains about half the milk solids consisting of most of the milk sugar (lactose), 20 percent of the milk protein, and most of the minerals and vitamins originally found in the milk. World-wide production of fluid cheese whey is estimated to be over 50 billion pounds annually.

Until recently, it was common practice in the United States where there is little casein production, for producers to treat cheese whey as a waste product. It was, therefore, discarded in lakes, rivers, streams, and fields with little thought of its pollution consequences. However, recent federal and state regulations currently prevent cheese producers from disposing of cheese whey as a waste product. Therefore, interest has developed to find new uses for this byproduct from cheese production.

A common solution for cheese whey utilization has been to simply dry the raw whey by conventional methods. However, dried cheese whey exhibits little functionality in most human food products. Therefore, simply drying the cheese whey merely reduces the volume of the whey pollution problem.

Since drying the whey may not result in a solution to whey utilization, attempts have been made to modify the whey solids to thereby increase the functionality of whey solids in human food systems. For example, reverse osmosis and ultrafiltration systems have been used to effectively separate the whey proteins from the lactose and minerals. However, these systems are expensive to operate and are currently only in the developmental stage.

Still another approach has been to physically precipitate the whey proteins by using a precipitating agent. For example sodium hexametaphosphate has been used to produce lactalbumin phosphates from whey, U.S. Pat. No. 3,269,843. However, while this patent discloses that lactalbumin phosphate exhibits improved binding in comminuted meat products, it does not disclose improved flavor enhancement. In addition, lactalbumin phosphate contains increased phosphate levels which may not be desired in certain human food systems.

Further, it is known that dried cheese whey exhibits limited utility in the area of meat applications. Spray dried whey is not used as a binder, flavor enhancer, or emulsifier in comminuted meat applications. It is, therefore, desirous to provide a modified whey solid that functions as a flavor enhancer for food and as a binder, flavor enhancer, and emulsifier suitable for use in comminuted meat applications.

BRIEF SUMMARY OF THE INVENTION

In accordance with the present invention, it has been found that modified dried whey derived by the molecular sieve fractionation of partially delactosed whey is effective as a flavor enhancing agent for food in general and as a binding agent, flavor enhancer, and emulsifier in comminuted meat products. The present invention is also directed to comminuted meat compositions comprising a bindingly effective amount of modified dried whey derived by the molecular sieve fractionation of partially delactosed whey and comminuted meat.

DETAILED DESCRIPTION OF THE INVENTION

In accordance with the present invention, flavor can be enhanced in food products by adding thereto modified dried whey in an amount effective to enhance flavor. The foods contemplated to be benefited by the present invention include meats, comminuted meats, sausage, meat patties, meat loaves, luncheon meats, gravies, both of a meat base such as gravy and imitations therof using hydrolyzed vegetable proteins and meat extracts, sauces, soups, including bouillion, stews, hash, pate, meal coatings for meat such as for fried chicken, cereals, vegetables, and sauces therefor such as frozen pouch type vegetables with sauce, teriyaki sauce, soy sauce, Chinese vegetables, salted fish and meat, and animal foods such as dog and cat food including dried, semimoist and moist, and cheese products such as spray dried cheese, processed cheese foods, chips, spreads, and cheese used to enhance flavor in snack foods. In essence, the modified whey products of the invention can be utilized in substantially all areas where other well known flavor enhancers such as monosodium glutamate (MSG) presently find utility.

The products of the present invention also have the advantage that they possess a small quantity of salt (NaCl) thereby avoiding the necessity of, in some instances, adding further salt to the food or, in other occasions, of reducing the amount of salt added.

The amount to be utilized generally should be sufficient to enhance flavor but not enough to cause flavor problems. Amounts of not over about 5 percent and preferably not over about 3 percent, by weight, based on the total weight of the food are recommended.

The modified whey solids can be effectively added by blending the solids with the food as, for example sausage, in a sausage blender. The solids can be effectively combined in other ways which bring the food and modified whey solids into contact.

It has been found that the whey solids are particularly effective in enhancing the flavor of meat and meat juices, such as in comminuted meats, meat patties, cooked sausage, meat sauces and gravies, and particularly comminuted meats, including cooked sausage and meat patties. Not only are the whey solids effective in enhancing flavor, but it has been found that the whey solids contribute to the binding and emulsification properties of comminuted meats, particularly cooked sausage. The amounts necessary to effect binding, flavor enhancement or emulsification are thought to be approximately the same. Thus, less than about 5 percent, preferably less than about 3.5 percent, and more preferably less than about 3 percent, by weight, of the whey solids are required for effective results.

By comminuted meat it is meant herein, comminuted meat food products prepared from one or more kinds of skeletal muscle meat or skeletal muscle meat and poultry meat. Specifically, by cooked sausages it is meant herein those comminuted meat products defined by the United States Department of Agriculture in 9 C.F.R. Section 319.180, for example, frankfurter, weiner, bologna, garlic bologna, knockwurst, and similar products. In addition to the sausage products described above comminuted meat further includes beef patties (9 C.F.R. Section 319.15 (c)) and nonspecific loaves as defined in 9 C.F.R. Section 319.280.

The modified dried whey as used in the present invention is the dried whey solids derived by drying the low protein-high ash fraction or second fraction obtained by passing partially delactosed cheese whey mother liquor through a bed of molecular sieve resin as disclosed in U.S. Pat. No. 3,547,900.

The preparation of the modified dried whey used in the present invention is illustrated in Example 1 which follows:

EXAMPLE 1

To about 6800 pounds of raw acid cheese whey containing about 430 pounds of solids, is added about 14.5 pounds of dry sodium hydroxide to adjust the pH to about 7.0. The pH adjusted raw whey is thereafter centrifugally clarified to remove insoluble solids. About 10 percent of the original solids is lost by clarification to yield about 397 pounds of solids in the supernatant.

The clarified supernatant is thereafter concentrated by conventional vacuum evaporative methods to about 60 percent solids. The concentrate thus obtained is then cooled to about 70°F. to effect lactose crystallization. Crystalline lactose is then removed by centrifugation to yield a partially delactosed cheese whey mother liquor. About 70 percent of the lactose originally present in raw cheese whey is removed by the above described delactosing method. The partially delactosed mother liquor contains about 40 percent solids and exhibits the following typical chemical analysis:

| | |
|---|---|
| Lactose, % | 46 |
| Protein (N×6.38),% | 20 |
| Ash, % | 20 |

At this point the partially delactosed mother liquor contains about 190 pounds of solids and is passed through a bed containing molecular sieve resin in accordance with the process described in U.S. Pat. No. 3,547,900. Two major fractions are obtained from the molecular sieve resin bed. The first fraction from the bed contains about 36 pounds of solids consisting mainly of protein with residual lactose and ash. The subsequent fraction which is used in the present invention contains mainly lactose and ash with residual protein.

Fractionation may be determined by measuring the conductivity of the eluant from the bed. Typically, the conductivity range for the subsequent fraction containing the modified whey solids of the present invention is between about 5,000 micromhos to about 15,000 micromhos, as is shown in FIG. 7 of U.S. Pat. No. 3,547,900.

The solution obtained by this fractionation pattern is then concentrated by conventional vacuum evaporative methods prior to spray drying. About 130 pounds of modified dried whey is obtained by the above described process exhibiting the following typical chemical analysis:

| | |
|---|---|
| Lactose, % | 35–45 |
| Ash, % | 20–30 |
| Protein (N×6.38), % | 15–20 |
| Lactate, % | 8 |
| Citrate, % | 5 |
| Moisture, % | 2 |
| Fat, % | 0.1 |

Generally, in the case of comminuted meat products, an effective amount of modified dried whey required to give improved binding, flavor enhancement, and emulsification is less than about 3.5 percent by weight of the final product. However, it is preferred that the amount of modified dried whey required to give improved binding, flavor enhancement, and emulsification in comminuted meat products be about 3.0 percent by weight of the final product. In order to further illustrate the invention, the following examples are presented in which parts and percentages are by weight unless otherwise specified.

EXAMPLES 2–6

Using the above described modified dried whey as prepared in Example 1, comminuted meats were prepared as follows:

To the meat mixture specified in Table I, amounts of fat, salt, sodium nitrate, dextrose, water, and indicated binder were added and then treated with 15 seconds chopping in an omnimixer. After refrigeration, the mixture was cooked in a hot water bath at 180°F until an internal temperature of 155°F. was reached. The sausage was then evaluated as described in Table II under the first cook column. A portion of the sausage was again refrigerated and then heated as previously described. The sausage was then evaluated for second cook purposes and the results presented in TAble II.

TABLE I

| | SAUSAGE PREPARATION | | | | |
|---|---|---|---|---|---|
| Ingredient Description | Example 2 | Example 3 | Example 4 | Example 5 | Example 6 |
| Meat [1] | 73% | 76% | 73% | 73% | 74% |
| Fat | 10% | 10% | 10% | 10% | 10% |
| Salt | 2% | 2% | 2% | 2% | 2% |
| Dextrose | 2% | 2% | 2% | 2% | 2% |
| Water | 10% | 10% | 10% | 10% | 10% |
| NFDM [2] | — | — | 3% | — | — |
| Modified Dry Whey | 3% | — | — | — | — |
| Dried Whey Isolated | — | — | — | 3% | — |
| Soy Protein | — | — | — | — | 2% |
| Sodium Nitrate | 150 ppm | 150 ppm | 150 ppm | 150 ppm | 150 ppm |

[1] Equal parts pork shoulder and chuck steak
[2] Non-fat Dry Milk

TABLE II

| Example | Sample Description | FIRST COOK Cook Loss % | FIRST COOK Knit | SECOND COOK Cook Less % | SECOND COOK Knit |
|---|---|---|---|---|---|
| 2 | 3% Modified Dried Whey | 2.6 | Slight | 0.1 | Slight |
| 3 | No Additive | 27.2 | Zero | 26.4 | Zero |
| 4 | 3% NFDM (Low Heat) | 24.8 | Zero | 23.9 | Zero |
| 5 | 3% Dried Whey | 2.8 | Slight | 1.8 | Slightly Moderate |
| 6 | 2% Isolated Soy Protein | 3.3 | Slight Plus | 0.7 | Slight |

The results of Table II show that modified dried whey prepared as described in Example 1 improves binding and emulsification in cooked sausages by exhibiting reduced cook loss with minimal knit.

The enhancement of flavor resulting from the addition of modified dried whey as described above to comminuted meat products was evaluated by flavor panel analysis. This flavor evaluation was conducted by comparing three sets of sausages prepared as described in Examples 2, 3, and 5. Six judges were used to evaluate these three sets of sausages according to flavor on a scale from best to worst. The results obtained from this flavor evaluation are presented in Table III.

TABLE III

FLAVOR EVALUATION OF SAUSAGES

| Judge | Flavor Rating Worst | Best |
|---|---|---|
| 1 | Ex. 3, Ex. 5 | Ex. 2 |
| 2 | Ex. 5, Ex. 3 | Ex. 2 |
| 3 | Ex. 3, Ex. 5 | Ex. 2 |
| 4 | Ex. 3, Ex. 5 | Ex. 2 |
| 5 | Ex. 5, Ex. 3 | Ex. 2 |
| 6 | Ex. 5, Ex. 3 | Ex. 2 |

This table shows that the set of sausages prepared as described in Example 2 was consistently superior to the other two sets of samples. Table III therefore shows that sausages prepared by the addition of modified dried whey are consistently superior in terms of flavor enhancement when compared with sausages prepared without the addition of a flavor enhancing agent or sausages prepared by the addition of dried whey.

What is claimed is:

1. A method of enhancing the flavor of food which comprises adding to said food in an amount effective to enhance the flavor of said food a modified dried whey derived by drying the low protein-high ash fraction obtained by the molecular sieve fractionation of partially delactosed whey and having the following general composition: Lactose, about 35–45 percent, Ash, about 20–30 percent, Protein about 15–20 percent, Lactate, about 8 percent, Citrate, about 5 percent, moisture, about 2 percent, Fat, about 0.1 percent.

2. The method of claim 1 wherein said food is comminuted meat.

3. The method of claim 2 wherein said comminuted meat is cooked sausage.

4. The method of claim 2 wherein said comminuted meat is a meat patty.

5. The method as recited in claim 1 wherein modified dried whey is used in an amount of less than 5 percent by weight based on the total weight of said food.

6. The method as recited in claim 1 wherein modified dried whey is used in an amount of less than 3 percent by weight based on the total weight of said food.

* * * * *